Patented Jan. 26, 1932

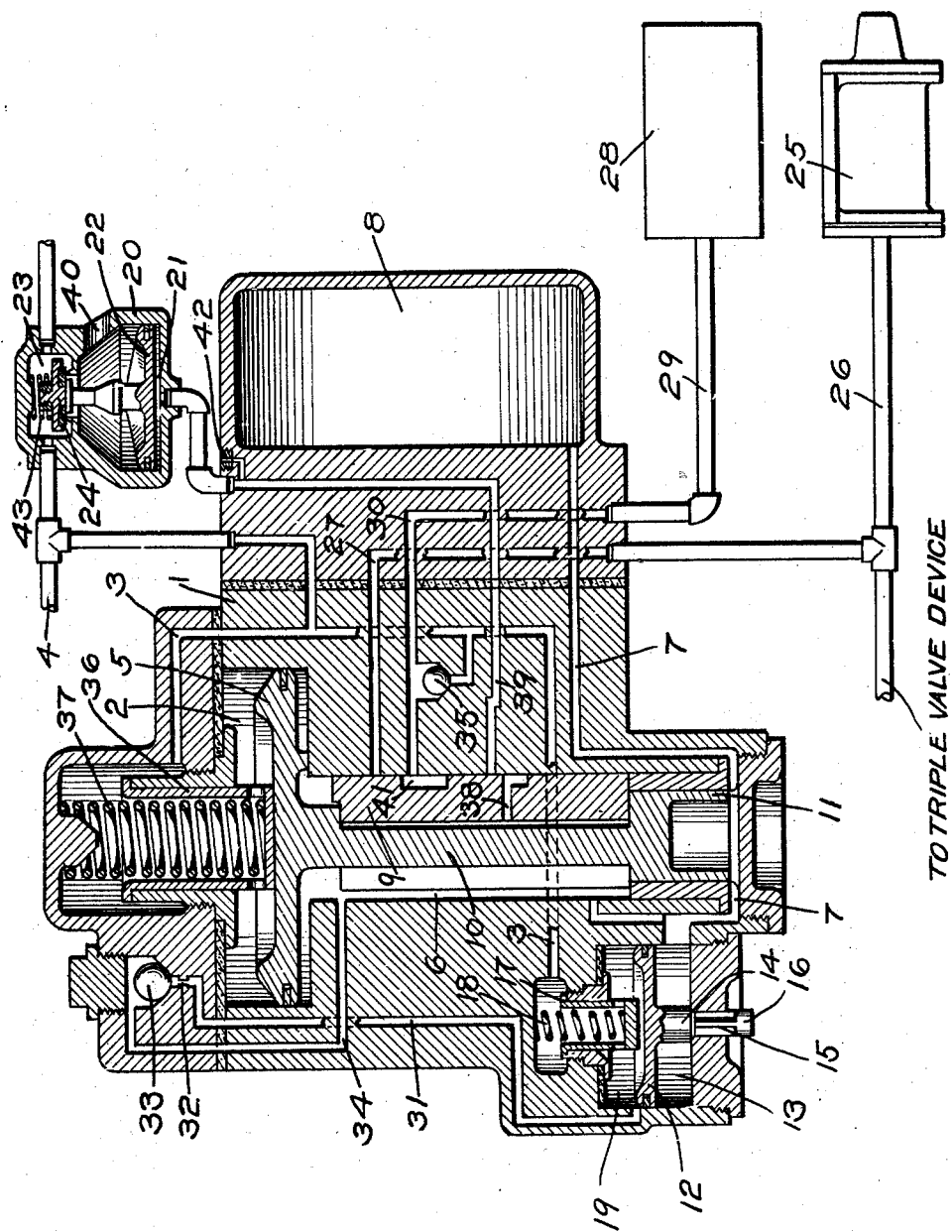

1,842,481

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed October 17, 1929. Serial No. 400,241.

This invention relates to fluid pressure brakes, and more particularly to a valve device operative upon a sudden reduction in brake pipe pressure for effecting an emergency application of the brakes.

It has heretofore been proposed to provide an emergency valve device comprising a main valve, an auxiliary valve, and a piston subject to the opposing pressures of the brake pipe and a quick action chamber for operating said valves.

When only a service rate of reduction in brake pipe pressure is effected, the piston of the emergency valve device moves the auxiliary valve, without moving the main valve and thereby vents fluid under pressure from the quick action chamber, so as to prevent movement of the piston to emergency position. When an emergency rate of reduction in brake pipe pressure is effected, the piston is moved to emergency position and the main valve is then operated to effect an emergency application of the brakes.

Movement of the pistons and auxilary valve of the emergency valve device, every time a service reduction in brake pipe pressure is effected, causes considerable wear of the piston rings, the bushing in which the piston reciprocates and the auxiliary valve. The principal object of my invention is to provide an improved emergency valve device of the above character, and in which the moving parts of the emergency valve device do not move when only a service reduction in brake pipe pressure is effected.

In the accompanying drawing, the single figure is a diagrammatic view of a portion of a railway vehicle fluid pressure brake equipment, showing the improved emergency valve device in section.

The improved emergency valve device may comprise a casing 1 having a piston chamber 2, connected through a passage 3 with the usual brake pipe 4 and containing an emergency piston 5. The casing also has a valve chamber 6, connected through a passage 7 with a quick action chamber 8 and containing a slide valve 9 adapted to be operated by piston 5, through a piston stem 10, the outer end of the stem having a cylindrical guide member 11.

For venting fluid under pressure from the quick action chamber when a service rate of reduction in brake pipe pressure is effected, a valve device is provided, comprising a piston 12, having the chamber 13 at one side of the piston connected to the quick action chamber passage 7 and carrying a vent valve 14, which is provided with a fluted stem 15 having the outer end 16 thereof cylindrical, so as to fill the bore in which the stem reciprocates, when the valve is moved sufficiently from its seat, and thereby prevents flow from chamber 13 to the atmosphere.

Upon a slight upward movement, the piston 12 is adapted to engage a graduating stem 17 subject to the pressure of spring 18. The chamber 19 above the piston 12 is connected to passage 3, opening into the brake pipe 4.

A vent valve device is provided comprising a casing 20 having a piston chamber 21 containing a piston 22 and having a valve chamber 23, open to the brake pipe 4 and containing a vent valve 24, adapted to be operated by piston 22.

Merely to illustrate a function of the emergency valve device, a brake cylinder 25 is shown connected to a pipe 26, which opens to a passage 27, leading to the seat of slide valve 9, and an emergency reservoir 28 is provided, which is connected to a pipe 29 and passage 30, leading to the seat of slide valve 10.

In operation, when the brake pipe 4 is charged with fluid under pressure, fluid flows through the passage 3 to piston chamber 2 and also through passage 3 to chamber 19. From chamber 19, fluid flows through passage 31, through a restricted port 32, and past check valve 33, to a passage 34, which opens to the valve chamber 6. The valve chamber 6 and the quick action chamber 8, which is connected to valve chamber 6, through passage 7, are thus charged with fluid under pressure, and the opposing fluid pressures on piston 5 being equalized, said piston remains in release position, as shown in the drawing. The brake cylinder 25 is connected to a triple valve device (not shown), as in Patent No. 1,585,774 of C. C. Farmer, issued May 25, 1926, and with the triple valve device in release position, the brake cylinder is connected to the atmosphere in the usual manner.

The piston 12 is subject on one side to brake pipe pressure in chamber 19 and on the opposite side to the quick action chamber pressure in chamber 13, so that with the brake pipe and quick action chamber pressures equal the piston 12 holds the valve 14 seated, as shown in the drawing.

The emergency reservoir 28 is charged with fluid under pressure from the brake pipe as supplied through passage 3, past the check valve 35 to passage 30.

When a gradual or service rate of brake pipe reduction is made, the piston 12 is moved upwardly by the higher pressure in chamber 13, until the piston engages the graduating stop 17. The valve 14 is thus unseated, and fluid under pressure is vented from the quick action chamber 8 and from valve chamber 6 to the atmosphere.

The venting of fluid under pressure from the valve chamber 6 prevents movement of the emergency piston 5 from its normal release position, assisted by the resistance of the spring stop member 36, which engages the piston 5 and is subject to the pressure of spring 37.

When the fluid pressure in the quick action chamber 8 and in chamber 13 has been reduced to substantially equal the brake pipe pressure in chamber 19, the piston 12 moves down and causes the valve 14 to seat, so as to cut off the further venting of fluid from the quick action chamber.

Further gradual reductions in brake pipe pressure cause the above operation of piston 12 and valve 14 to be repeated, so that the emergency piston 5 is prevented from moving from its release position, so long as the reductions in brake pipe pressure are at a service rate.

In the movement of piston 12 to service position, the piston operates to cut off communication from passage 31 to chamber 19, so that fluid under pressure is prevented from flowing from the quick action chamber to the brake pipe. The pressure in the quick action chamber is thus prevented from reducing when the brake pipe pressure is reduced in effecting an application of the brakes.

When a sudden reduction in brake pipe pressure is made to effect an emergency application of the brakes, the piston 12 is moved upwardly with sufficient force to compress the spring 18, so that piston 12 moves to its upper seat. In this movement, the cylindrical portion 16 engages in the bore in which the stem 15 slides, and thus cuts off the venting of fluid under pressure from the quick action chamber by the opening of valve 14.

Since fluid under pressure is not vented from the quick action chamber and the valve chamber 6, the emergency piston 5 is moved upwardly when the brake pipe pressure is suddenly reduced, by the higher pressure in valve chamber 6.

Upon the initial movement of the slide valve 9, a through port 38 in the valve registers with passage 39, leading to piston chamber 21 of the vent valve device, so that fluid under pressure is supplied from the valve chamber 6 to piston chamber 21, and thereby the piston 22 is operated to open the vent valve 24. Fluid under pressure is then vented from the brake pipe 4 to the atmospheric port 40, so as to produce a local reduction in brake pipe pressure.

The local venting of fluid from the brake pipe assures the prompt movement of the emergency piston 5 to emergency position.

In emergency position, a cavity 41 in slide valve 9 connects passage 30 with passage 27, so that fluid under pressure is supplied from the emergency reservoir 28 to the brake cylinder 25, to effect an emergency application of the brakes.

The port 38 remains connected to passage 39 in emergency position, and fluid under pressure in the valve chamber 6, the quick action chamber 8, and the piston chamber 21, slowly bleeds down through a restricted atmospheric port 42.

When the pressure in piston chamber 21 has been reduced to a low degree, the spring 43 operates to move the valve 24 to its seat, cutting off communication from the brake pipe to the vent port 40.

The bleeding down of the pressure in valve chamber 6 also permits the spring 37 to return the emergency piston 5 and slide valve 9 to normal release position, and the piston 12 is likewise moved to the position seating the valve 14 by the spring 18.

When the brake pipe pressure is increased to effect the release of the brakes, the triple valve device (not shown) is moved to release position in the usual manner, and the brake cylinder 25 is vented to the atmosphere. The various chambers and reservoirs of the emergency valve device are again charged with fluid under pressure, as in the initial charging operation, hereinbefore described.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:—

1. In a fluid pressure brake, the combination with a brake pipe, of an emergency valve device subject to the opposing pressures of the brake pipe and a chamber and operated upon an emergency rate of reduction in brake pipe pressure for effecting an emergency application of the brakes and valve means separate from said emergency valve device and operated upon a service rate of reduction in brake pipe pressure for venting fluid under pressure from said chamber to prevent said emergency valve device from operating upon a service rate of reduction in brake pipe pressure.

2. In a fluid pressure brake, the combination with a brake pipe, of an emergency valve device, comprising a piston subject to the opposing pressures of the brake pipe and a chamber and valve means operated by said piston upon a sudden reduction in brake pipe pressure for effecting an emergency application of the brakes and a separate valve device operated upon a gradual reduction in brake pipe pressure for venting fluid under pressure from said chamber, to prevent movement of said piston upon a gradual reduction in brake pipe pressure.

3. In a fluid pressure brake, the combination with a brake pipe, of an emergency valve device subject to the opposing pressures of the brake pipe and a chamber and operated upon a sudden reduction in brake pipe pressure for effecting an emergency application of the brakes, and a piston and a valve movable to one position upon a gradual reduction in brake pipe pressure for venting fluid under pressure from said chamber and movable to another position upon a sudden reduction in brake pipe pressure in which fluid is not vented from said chamber.

4. In a fluid pressure brake, the combination with a brake pipe, of an emergency valve device subject to the opposing pressures of the brake pipe and a chamber and operated upon a sudden reduction in brake pipe pressure for effecting an emergency application of the brakes, a piston subject to the opposing pressures of the brake pipe and said chamber, and a valve movable by said piston to one position upon a gradual reduction in brake pipe pressure for venting fluid under pressure from said chamber and movable to another position upon a sudden reduction in brake pipe pressure in which position, fluid is not vented from said chamber.

5. In a fluid pressure brake, the combination with a brake pipe, of an emergency valve device subject to the opposing pressures of the brake pipe and a chamber and operated upon a sudden reduction in brake pipe pressure for effecting an emergency application of the brakes, and a valve device controlling communication through which said chamber is charged with fluid under pressure and operated upon a gradual reduction in brake pipe pressure for venting fluid under pressure from said chamber and for cutting off said communication.

6. In a fluid pressure brake, the combination with a brake pipe, of an emergency valve device, subject to the opposing pressures of the brake pipe and a chamber and operated upon a sudden reduction in brake pipe pressure for effecting an emergency application of the brakes, and a valve device controlling a communication from the brake pipe to said chamber, through which fluid under pressure is supplied to said chamber, said valve being operated upon a gradual reduction in brake pipe pressure for preventing the supply of fluid from the brake pipe to said chamber and for venting fluid under pressure from said chamber.

7. In a fluid pressure brake, the combination with a brake pipe, of an emergency valve device subject to the opposing pressures of the brake pipe and a chamber and operated upon a sudden reduction in brake pipe pressure for effecting an emergency application of the brakes, a piston subject to the opposing pressures of the brake pipe and said chamber, a valve movable by said piston to one position upon a gradual reduction in brake pipe pressure for venting fluid from said chamber and movable to another position upon a sudden reduction in brake pipe pressure, and a stem carried by said valve and adapted to cut off communication through which fluid is vented from said chamber in said last mentioned position.

8. In a fluid pressure brake, the combination with a brake pipe, of an emergency valve device subject to the opposing pressures of the brake pipe and a chamber and operated upon a sudden reduction in brake pipe pressure for effecting an emergency application of the brakes, a piston subject to the opposing pressures of the brake pipe and said chamber, a valve movable by said piston to one position upon a gradual reduction in brake pipe pressure for venting fluid from said chamber and movable to another position upon a sudden reduction in brake pipe pressure in which venting of fluid from the chamber is cut off, and yielding means for opposing movement of said piston from the first mentioned position to the second mentioned position.

9. In a fluid pressure brake, the combination with a brake pipe, of an emergency valve device subject to the opposing pressures of the brake pipe and a chamber and operated upon a sudden reduction in brake pipe pressure for effecting an emergency application of the brakes, a piston subject to the opposing pressures of the brake pipe and said chamber, a valve movable by said piston to one position upon a gradual reduction in brake pipe pressure for venting fluid from said chamber and movable to another position upon a sudden reduction in brake pipe pressure, a stem carried by said valve and having means for cutting off communication through which fluid is vented from said chamber, when said valve is moved to its last mentioned position; and yielding means for opposing movement of said piston from its first mentioned position to its second mentioned position.

In testimony whereof, I have hereunto set my hand.

MABLE M. THOMAS,
*Executrix of the Last Will and Testament of Thomas H. Thomas, Deceased.*